Jan. 2, 1945. H. P. THOMAS 2,366,159
BELT TIGHTENING DEVICE
Filed April 14, 1943
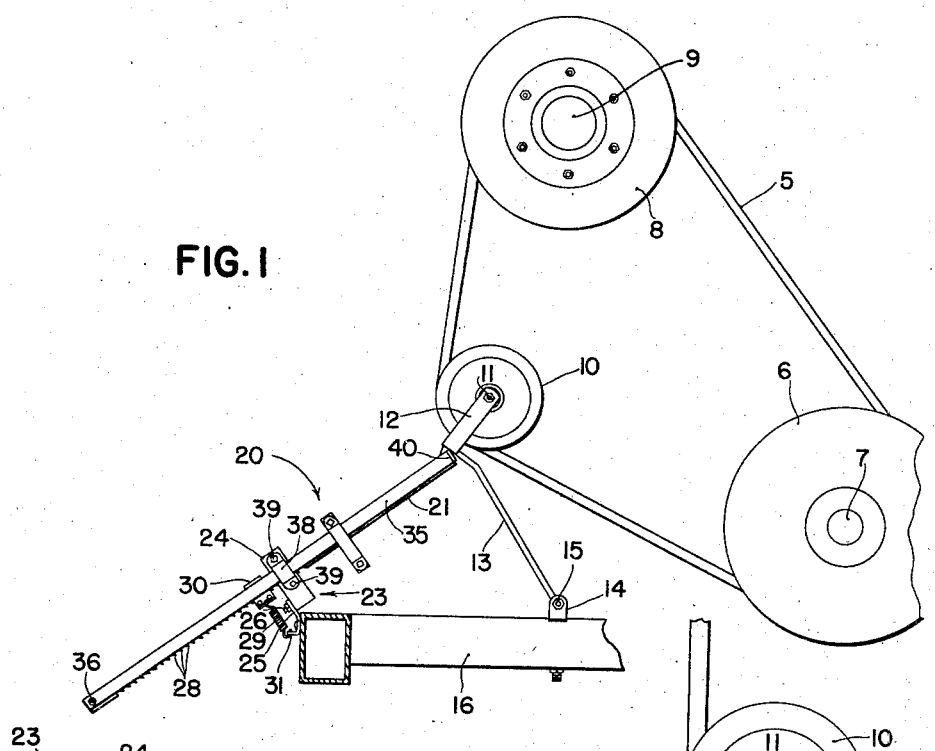
FIG. 1
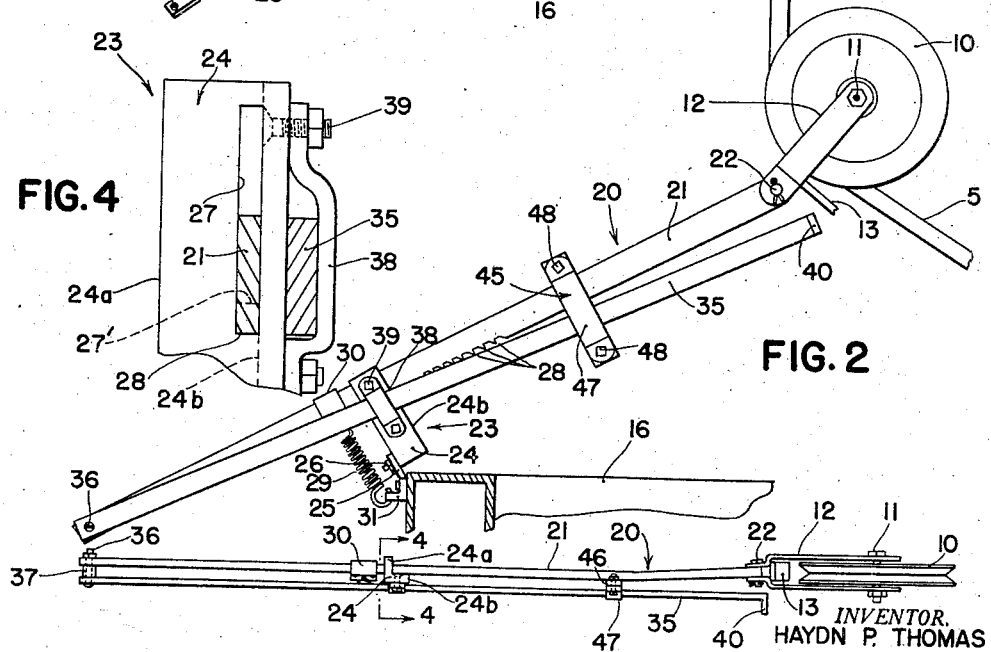
FIG. 4
FIG. 2
FIG. 3
INVENTOR.
HAYDN P. THOMAS
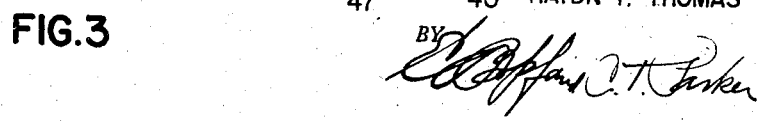
BY Patented Jan. 2, 1945

2,366,159

UNITED STATES PATENT OFFICE 2,366,159

BELT-TIGHTENING DEVICE

Haydn P. Thomas, East Moline, Ill., assignor to Deere & Company, Moline, Ill., a corporation of Illinois Application April 14, 1943, Serial No. 483,068

10 Claims. (Cl. 74—242.10)

The present invention relates to belt tightening devices and has for its principal object the provision of a quickly releasable means for securing a belt tightener sheave in several different positions of adjustment in order to control the tension in a power transmitting belt. A further object of my invention relates to the provision of a belt tightening device which can be installed in places which are restricted in space and difficult of access.

This invention is particularly well adapted, but not limited to controlling the tension of the main drive belt on the cylinder of a combine, in which the belt tightener is usually located between the thresher body and the grain tank in a rather limited amount of space. In this preferred embodiment of my invention, the main drive belt is a V-belt operating over a pair of grooved pulleys, at least one of the latter being of adjustable diameter to obtain an adjustment of the speed of the threshing cylinder. Whenever an adjustment is made of the diameter of one of the pulleys, it has heretofore been necessary for the operator to walk around to the rear of the grain tank in order to release the tension on the belt tightening device sufficiently to permit an adjustment of the pulley diameter, after which it was again necessary to adjust the belt tighter to tighten the belt from a position behind the grain tank. It is a more specific object of my invention, therefore, to provide a novel and simple belt tightener, which can be controlled from a position adjacent the adjustable V-belt pulley, thereby eliminating any necessity for the operator to walk around to the rear of the grain tank in order to adjust the tension on the belt. This, however, is but one use for a device of this kind, and other objects and advantages of my invention will become evident to those skilled in the art after a consideration of the following description, in which reference is had to the drawing appended hereto, in which Figure 1 is a side elevational view of the preferred embodiment of my invention, showing the parts in their normal operating position;

Figure 2 is a side elevational view of the belt tightening device, drawn to an enlarged scale and showing the parts in the position in which the belt tightener can be loosened;

Figure 3 is a plan view of the belt tightening device; and

Figure 4 is a sectional elevational view taken along a line 4—4 in Figure 3 and drawn to an enlarged scale.

Referring now to the drawing, reference numeral 5 indicates a drive belt, in this case a V-belt of any conventional design. The belt 5 is trained over a drive pulley 6 mounted on a drive shaft 7, and over a driven pulley 8 mounted on the cylinder shaft 9 of the combine. The pulleys 6 and 8 are preferably of the usual V-grooved type adapted to receive the tapered sides of the V-belt 5. The driven pulley 8 is preferably of the adjustable diameter type which is well-known to those skilled in the art and needs no detailed explanation here, since the details of the pulleys and belt have no specific bearing on the operation of the belt tightening device which is the subject of the present invention.

The belt tightening device comprises an idler sheave 10 of suitable grooved conformation to receive the slack side of the drive belt 5. The sheave 10 is journaled on a stub shaft 11, which is supported in a U-shaped yoke member 12. The yoke 12 is mounted on the free end of an arm 13, which is pivotally mounted at its opposite end on a bracket 14 by means of a pivot bolt 15. The bracket 14 is secured rigidly to a relatively stationary frame member 16. Thus, the sheave 10 can be moved from a relatively loose engagement with the drive belt 5 to a belt tightening position by swinging the yoke 12 and arm 13 in a counter-clockwise direction about the bolt 15, as viewed in Figure 1.

The sheave 10 is retained in belt tightening position by means of a tensioning device, indicated generally by reference numeral 20, which comprises a tensioning member in the form of a bar 21, pivotally connected at one end to the yoke 12, by means of a pivot pin 22. The other end of the bar 21 is carried in a guide member 23, comprising a short length of structural angle member 24, disposed in an upwardly and rearwardly inclined position and supported on a bracket 25 by means of a bolt 26. The bracket 25 is fixed to the main supporting frame 16.

The angle member 24 is disposed with one flange 24a lying in a plane substantially transverse to the bar 21 and has a slot 27 provided adjacent the other flange 24b. The slot is adapted to receive the bar 21 in slidable relation, and the lower edge of the bar 21 is notched to provide a plurality of teeth 28, which are inclined in a direction toward the sheave 10. In other words, the teeth 28 are in effect, ratchet teeth, each of which has a front side toward the sheave disposed in a plane substantially perpendicular to the bar 21, and its rear side away from the sheave inclined to the major axis of the bar 21. The teeth 28 are adapted to engage the lower edge 27' of the slot 27 to restrain the idler 10 in belt tightening position and to prevent the arm 13 from swinging in a clockwise direction as viewed in Figure 1. The bar 21 is urged downwardly to maintain the teeth 28 in engaged position relative to the lower edge 27' of the slot 27, by means of a tension spring 29 secured at its upper end to a clip 30, which is slidable on the bar 21. The lower end of the spring 29 is anchored to a bracket 31 fixed to the frame 16. By virtue of the inclination of the teeth 28, the bar 21 will slide rearwardly, or to the left as viewed in Figure 1. Movement in this direction is easily accomplished by merely pushing the idler 10 rearwardly, which will cause the teeth to ratchet over the engaging edge 27', since very little resistance to movement in this direction is offered by the inclined edges of the teeth 28. Thus, the bar 21 will slide through the slot 27 and through the clip 30, but the teeth 28 will secure the bar in any position of adjustment, and prevent it from moving forwardly toward belt loosening position. The belt can be loosened, however, by raising the rear end of the bar 21 against the pressure of the spring 29, thus disengaging the teeth 28 from the lower edge 27' of the slot 27, after which the bar 21 can be slid forwardly through the upper portion of the slot 27. Heretofore however, it has been necessary for the operator to take hold of the rear end of the bar 21 to lift the teeth out of engagement, and this is not always easily accessible to the operator from a position in front of the idler sheave 10, for it is sometimes desirable to place the tightening device 20 in a restricted space, such as between two pieces of equipment, for example, between the body and grain tank of a combine. According to the present invention, however, this adjustment is easily made from a position in front of the idler sheave 10, by means of a control lever 35, which is pivotally connected to the rear end of the bar 21 by means of a pivot bolt 36, which passes through aligned apertures in the bar 21 and lever 35 and also through a spacing collar 37 therebetween. The control lever 35 extends forwardly alongside the notched bar 21, and is supported in a strap member 38, which is secured to the fore and aft extending flange 24b of the angle guide member 24, by means of bolts 39. The forward end of the control lever 35 is provided with a laterally turned end 40, serving as a handle.

It is now evident that the rear end of the bar 21 can be lifted by depressing the handle 40, causing the lever 35 to bear upon the strap member 38 as a fulcrum and raise the rear end of the bar 21 through the pivot bolt 36. After the lever 35 has been pushed downwardly sufficient to disengage the teeth 28 from the lower edge 27' of the slot, the lever 35 can be pulled forwardly by means of the handle 40, thereby sliding the lever 35 along its fulcrum and carrying with it the notched bar 21, which slides through the slot 27 and through the spring clip member 30. Whenever the handle 40 is released, the spring 29 pulls the bar 21 downwardly and engages the teeth with the engaging edge 27'.

As explained above, the belt can be retightened by merely pushing rearwardly on the idler sheave 10 or on the control handle 40, whereupon the teeth 28 of the bar 21 slide over the engaging edge 27' and hold the bar 21 in any adjusted position.

Another guide 45 is provided toward the forward ends of the bar 21 and lever 35, to secure the latter against lateral vibration. This guide 45 comprises a bracket 46 in the form of a bar secured as by welding to the side of the bar 21, and a strap member 47 is connected to the bar by bolts 48 and provides a slot between the bar 46 and strap 47, through which is slidable the control lever 35.

It is evident to those skilled in the art that the device described above greatly facilitates the operation of adjusting the speed of the driven shaft 9, for the idler 10 can be quickly and easily released from tightening position by pressing down on the lever 35 and pulling it forwardly, after which the necessary adjustment to the pulley 8 can be accomplished, after which the belt is retightened by merely pushing rearwardly on the idler 10 until the belt is tight.

I claim:

1. In a belt tightener comprising a yoke and a sheave journaled therein, a quickly releasable tensioning means comprising a notched member fastened to said yoke, a support and guide member for said notched member and having a part engageable with the notches on the latter, spring means retaining said members in engaged relation but yieldable to permit disengagement thereof, and a pivotally supported control element engaging said members and swingable to force the latter apart to disengage them against the action of said spring.

2. In a belt tightener comprising a yoke and a sheave journaled therein, a quickly releasable tensioning means comprising a member fastened to said yoke and having inclined ratchet teeth along one side thereof, a support and guide member for said toothed member, having a part engageable with said ratchet teeth providing for relative movement therebetween for shifting said notched member to tighten the belt, but retaining the same in adjused position, spring means retaining said members in engaged relation but yieldable to permit disengagement thereof, and a pivotally supported control element engaging said members and swingable to force the latter apart to disengage them against the action of said spring.

3. In combination, a belt tightener sheave, a yoke journaled thereon, a supporting arm attached to said yoke at one end of said arm, the other end being pivotally supported for swinging said sheave between tight and loose positions relative to a belt, and a quickly releasable tensioning means comprising a bar member pivotally connected to said yoke and having inclined ratchet teeth along one side thereof, a support and guide member for said toothed member, having a part engageable with said ratchet teeth providing for relative movement therebetween for shifting said notched member to tighten the belt, but retaining the same in adjusted position, spring means retaining said members in engaged relation but yieldable to permit disengagement thereof, and a control element connected to one of said members and adapted to act against the other member for disengaging said members to permit loosening of the belt.

4. In a belt tightener comprising a yoke and a sheave journaled therein, a quickly releasable tensioning means comprising a notched member fastened to said yoke, a support and guide member for said notched member, having a part engageable with the notches on the latter and biased into engaged relation, but yieldable to permit disengagement thereof, and a shiftably mounted releasing control handle acting between said members to disengage said notches from said part.

5. In a belt tightener comprising a yoke and a sheave journaled therein, a quickly releasable tensioning means comprising a notched member fastened to said yoke, a guide member for said notched member, having a part engageable with the notches on the latter and biased into engaged relation, but yieldable to permit disengagement thereof, and a release lever pivoted on one of said members and swingable into engagement with the other of said members to disengage said members.

6. In a belt tightener comprising a yoke and a sheave journaled therein, a quickly releasable tensioning means comprising a member fastened to said yoke and having inclined ratchet teeth along one side thereof, a guide member for said toothed member, having a part engageable with said ratchet teeth, the latter being slidable relative to said part in a belt tightening direction but held against movement in a loosening direction, means biasing said members into engagement, and a control lever pivoted on one of said members and swingable into engagement with the other of said members to separate said teeth from engagement with said part to loosen the belt.

7. In a belt tightener comprising a yoke and a sheave journaled therein, a quickly releasable tensioning means comprising a notched member fastened to said yoke, a guide member for said notched member, having a part engageable with the notches on the latter and biased into engaged relation, but yieldable to permit disengagement thereof, a release lever pivoted on said notched member and extending generally parallel thereto, and relatively stationary fulcrum means for receiving said release lever to permit said notched member to be raised out of engagement with said part, said lever being slidable on said fulcrum whereby said tightener can be shifted relative to said guide by sliding said lever along said fulcrum.

8. The combination set forth in claim 7 including the further provision that said notched member and control lever comprise a pair of bars pivotally connected together and supported on said guide member, which also serves as said fulcrum.

9. In a belt tightener comprising a yoke and a sheave journaled therein, a quickly releasable tensioning means comprising a notched bar attached at one end to said yoke and supported in a guide member having a part adapted to engage the notches on said bar member, spring means yieldably urging said members into engagement, and a release control lever pivoted to the other end of said bar and slidably supported on said guide member, said lever having a handle adjacent said yoke whereby the lever can be swung to disengage said notched bar from said guide member and then shifted longitudinally to adjust the tension on the belt.

10. In combination, a belt tightener sheave, a yoke in which said sheave is journaled, a supporting arm attached to said yoke at one end of said arm, the other end being pivotally supported for swinging said sheave between belt tightening and belt loosening positions, a bar pivotally connected at one end with said yoke, a guide member carrying the other end of said bar, the latter being provided with ratchet teeth permitting free movement of said sheave to tightening position but retaining said sheave in said tightening position, spring means yieldably urging said members into engagement, and a release control lever pivoted to the other end of said bar and slidably supported on said guide member, said lever having a handle adjacent said yoke whereby the lever can be swung to disengage said notched bar from said guide member and then shifted longitudinally to belt loosening position.

HAYDN P. THOMAS.